United States Patent [19]
Beauchamp

[11] Patent Number: 5,905,512
[45] Date of Patent: May 18, 1999

[54] UNITARY LIGHT TUBE FOR MOUNTING OPTICAL SENSOR COMPONENTS ON AN INKJET PRINTER CARRIAGE

[75] Inventor: Robert W. Beauchamp, Carlsbad, Calif.

[73] Assignee: Hewlett-Packard Company, Palo Alto, Calif.

[21] Appl. No.: 08/558,571

[22] Filed: Oct. 31, 1995

Related U.S. Application Data

[63] Continuation-in-part of application No. 08/540,908, Oct. 11, 1995, Pat. No. 5,600,350, which is a continuation of application No. 08/055,624, Apr. 30, 1993, abandoned, which is a continuation-in-part of application No. 08/153,712, Nov. 16, 1993, abandoned, which is a continuation of application No. 07/763,889, Sep. 20, 1991, abandoned.

[51] Int. Cl.⁶ .................................................. B41J 29/393
[52] U.S. Cl. ............................................. 347/19; 347/37
[58] Field of Search ................... 347/19, 37, 40, 347/43; 356/372, 402, 445, 448; 250/226, 208.2, 578.1

[56] References Cited

U.S. PATENT DOCUMENTS

| | | | |
|---|---|---|---|
| 4,916,638 | 4/1990 | Haselby et al. | 364/519 |
| 5,170,047 | 12/1992 | Beauchamp et al. | 250/202 |
| 5,404,020 | 4/1995 | Cobbs | 250/548 |

*Primary Examiner*—Safet Metjahic
*Assistant Examiner*—John Chizmar
*Attorney, Agent, or Firm*—David S. Romney

[57] ABSTRACT

A carriage-mounted optical sensor for an inkjet printer/plotter includes a unitary light tube member which holds the optical components in fixed positions relative to each other as well as relative to an outer protective casing which attaches to the carriage. The light tube member serves as a cap to capture two LEDs between itself and a protective casing, to capture an optical lens between itself and a photocell holder, and to directly engage the casing.

17 Claims, 9 Drawing Sheets

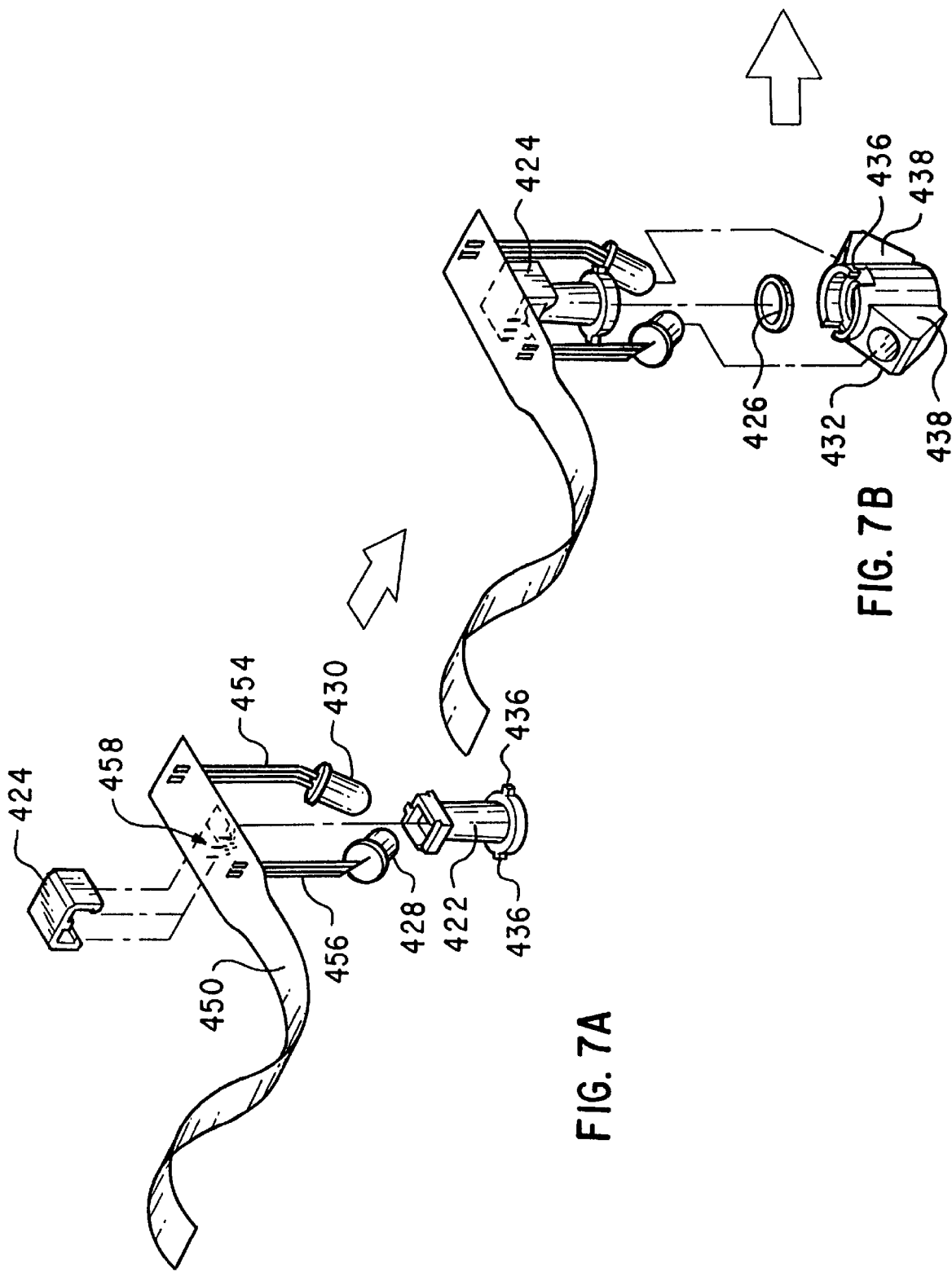

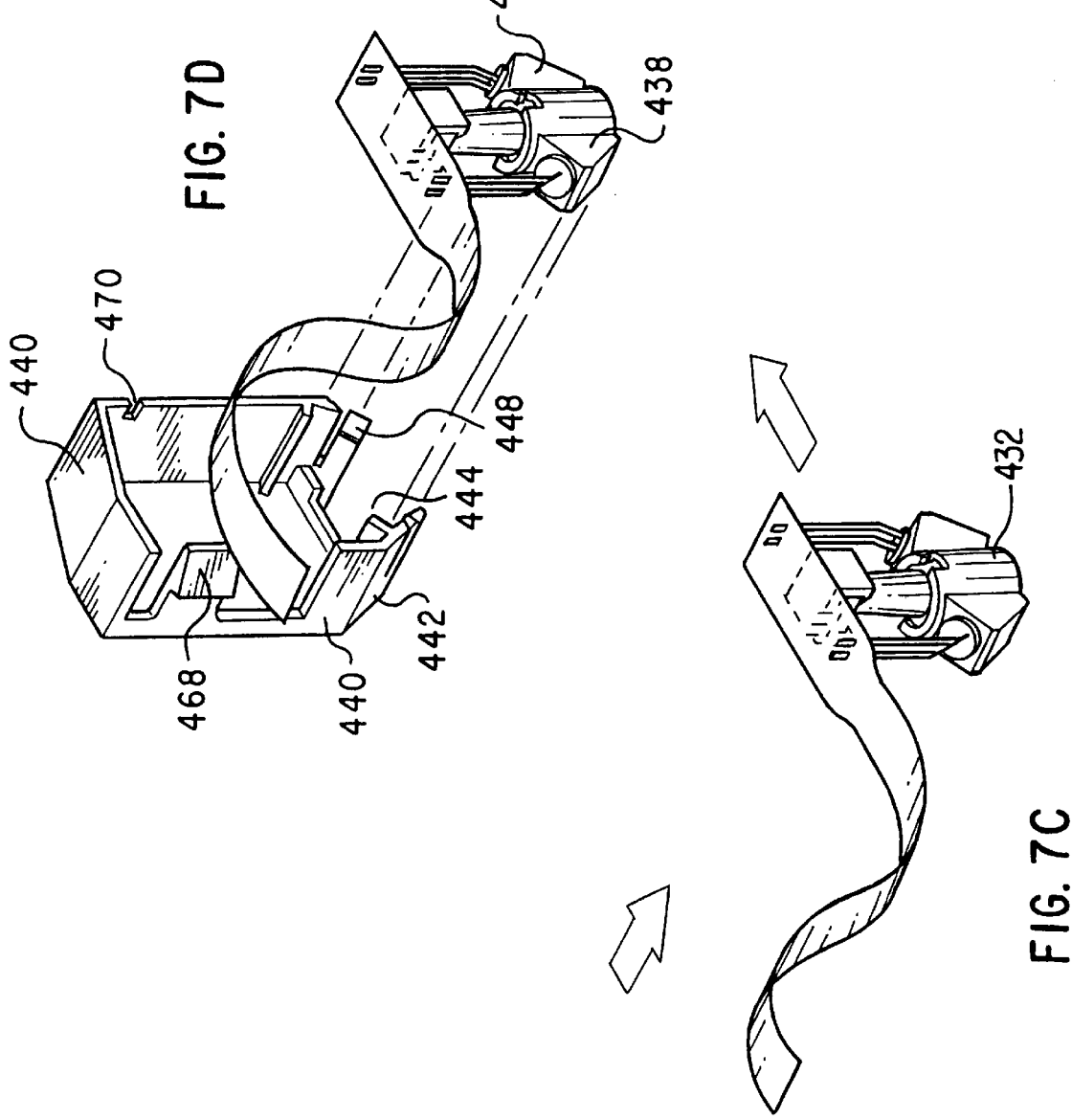

UNITARY LIGHT TUBE FOR MOUNTING OPTICAL SENSOR COMPONENTS ON AN INKJET PRINTER CARRIAGE

RELATED APPLICATIONS

This application is a continuation-in-part of Ser. No. 08/540,908 filed on Oct. 11, 1995 (now U.S. Pat. No. 5,600,350), which is a continuation of Ser. No. 55,624 filed on Apr. 30, 1993 now abandoned in the names of Keith E. Cobbs, Robert W. Beauchamp and Paul R. Sorenson. This application is also a continuation-in-part of Ser. No. 153,712 filed on Nov. 16, 1993 now abandoned, which is a continuation of Ser. No. 763,889 filed on Sep. 20, 1991 now abandoned, in the names of Robert W. Beauchamp, et al.

BACKGROUND OF THE INVENTION this invention relates generally to inkjet printers/plotters, and more specifically to carriage-mounted optical sensors in an inkjet printer/plotter.

Many print quality benefits are achieved by mounting an optical sensor on a carriage which also carries printing elements, since the optical sensor can then pass over the media upon which the printing elements are applying alphanumeric indicia, graphics or images. For example, see commonly assigned U.S. Pat. No. 5,170,047 entitled OPTICAL SENSOR FOR PLOTTER PEN VERIFICATION, and U.S. Pat. No. 5,448,269 entitled MULTIPLE INKJET CARTRIDGE ALIGNMENT FOR BIDIRECTIONAL PRINTING BY SCANNING A REFERENCE PATTERN, both of which are incorporated herein by reference.

The full color inkjet printer/plotters which have been developed comprise a plurality of inkjet pens of diverse colors. A typical color inkjet printer/plotter has four inkjet pens, one that stores black ink, and three that store colored inks, e.g., magenta, cyan and yellow. The colors from the three color pens are mixed to obtain any particular color.

The pens are typically mounted in stalls within an assembly which is mounted on the carriage of the printer/plotter. The carriage assembly positions the inkjet pens and typically holds the circuitry required for interface to the heater circuits in the inkjet pens.

Full color printing and plotting requires that the colors from the individual pens be precisely applied to the media. This requires precise alignment of the carriage assembly. Unfortunately, mechanical misalignment of the pens in conventional inkjet printer/plotters results in offsets in the X direction (in the media or paper axis) and in the Y direction (in the scan or carriage axis). This misalignment of the carriage assembly manifests as a misregistration of the print images applied by the individual pens. In addition, other misalignments may arise due to the speed of the carriage, the curvature of the platen and/or spray from the nozzles.

However, the integration of the optical and electronic components in the optical sensor, as well as positioning the optical sensor on the carriage have been complicated, expensive and to some extent imprecise in prior printers/plotters. The need for reliability and precision is even greater in recent inkjet printers/plotters which print high resolution color graphics and images, often on very large poster-size printouts.

BRIEF SUMMARY OF THE INVENTION

Accordingly, it is a general object of the invention to provide a modular structure which integrates the optical and electronic components in a simplified but reliable way on an optical sensor unit.

More specifically, the invention contemplates a carriage mounted optical sensor for an inkjet printer/plotter which includes a unitary light tube member which acts as a cap for holding the optical components in fixed positions relative to an outer protective casing. The light tube captures two LEDs between itself and the casing, captures an optical lens between itself and a photocell holder, and directly engages the casing.

BRIEF DESCRIPTION OF THE DRAWINGS

FIGS. 7A, 7B, 7C, 7D and 7E are a sequential representation showing a presently preferred set of modular assembly steps for the optical sensor unit;

DETAILED DESCRIPTION OF PREFERRED EMBODIMENT

Figure 1:
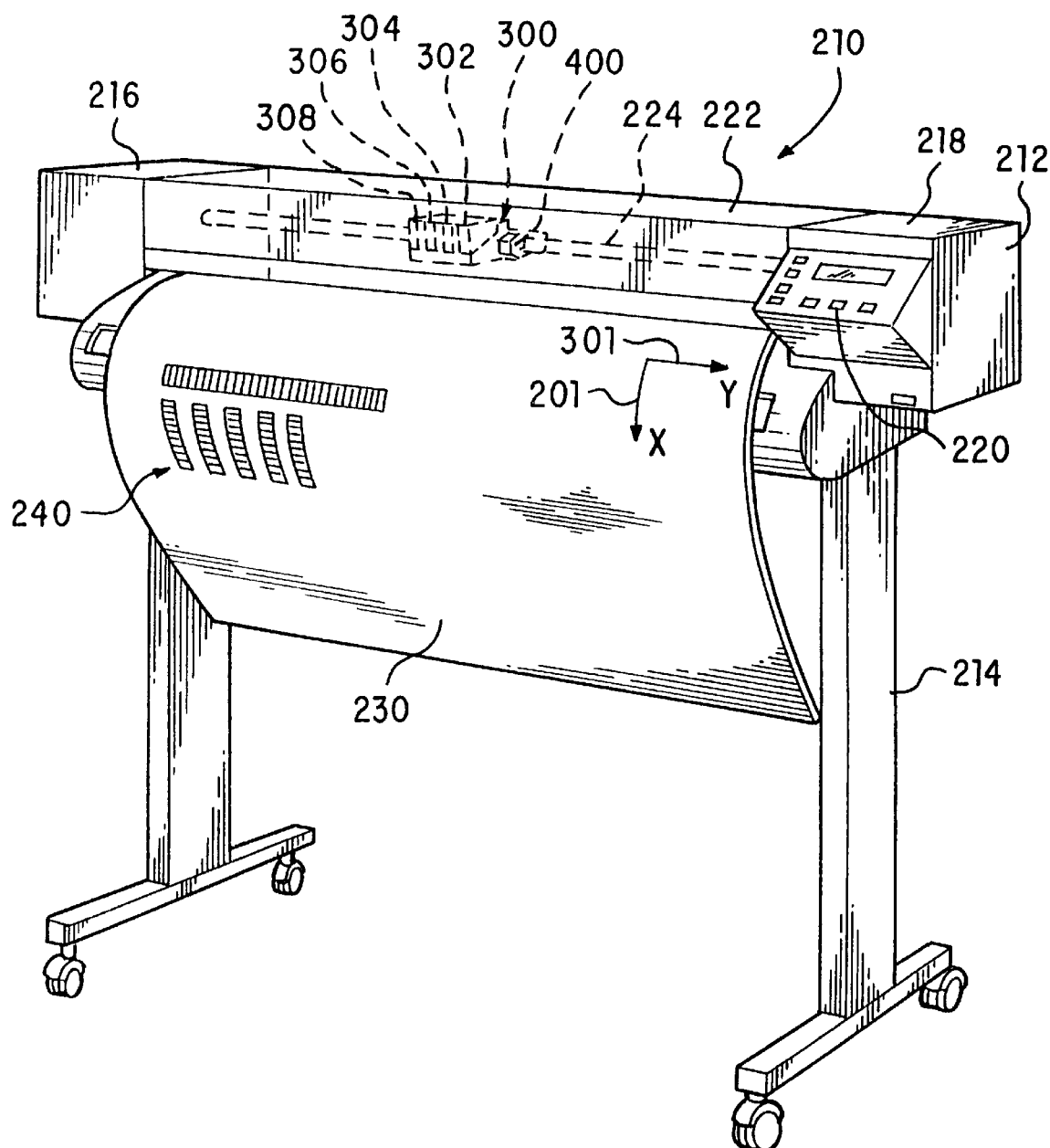
FIG. 1 is a perspective view of a large format inkjet printer/plotter incorporating the features of the present invention.

FIG. 1 is a perspective view of an inkjet large format printer/plotter incorporating the teachings of the present invention. The printer 210 includes a housing 212 mounted on a stand 214. The housing has left and right drive mechanism enclosures 216 and 218. A control panel 220 is mounted on the right enclosure 218. A carriage assembly 300, illustrated in phantom under a cover 222, is adapted for reciprocal motion along a carriage bar 224, also shown in phantom. The position of the carriage assembly 300 in a horizontal or carriage scan axis is determined by a carriage positioning mechanism 310 with respect to an encoder strip 320 (see FIG. 2). A print medium 330 such as paper is positioned along a vertical or media axis by a media axis drive mechanism (not shown). As used herein, the media axis is called the X axis denoted as 201, and the scan axis is called the Y axis denoted as 301.

Figure 2:
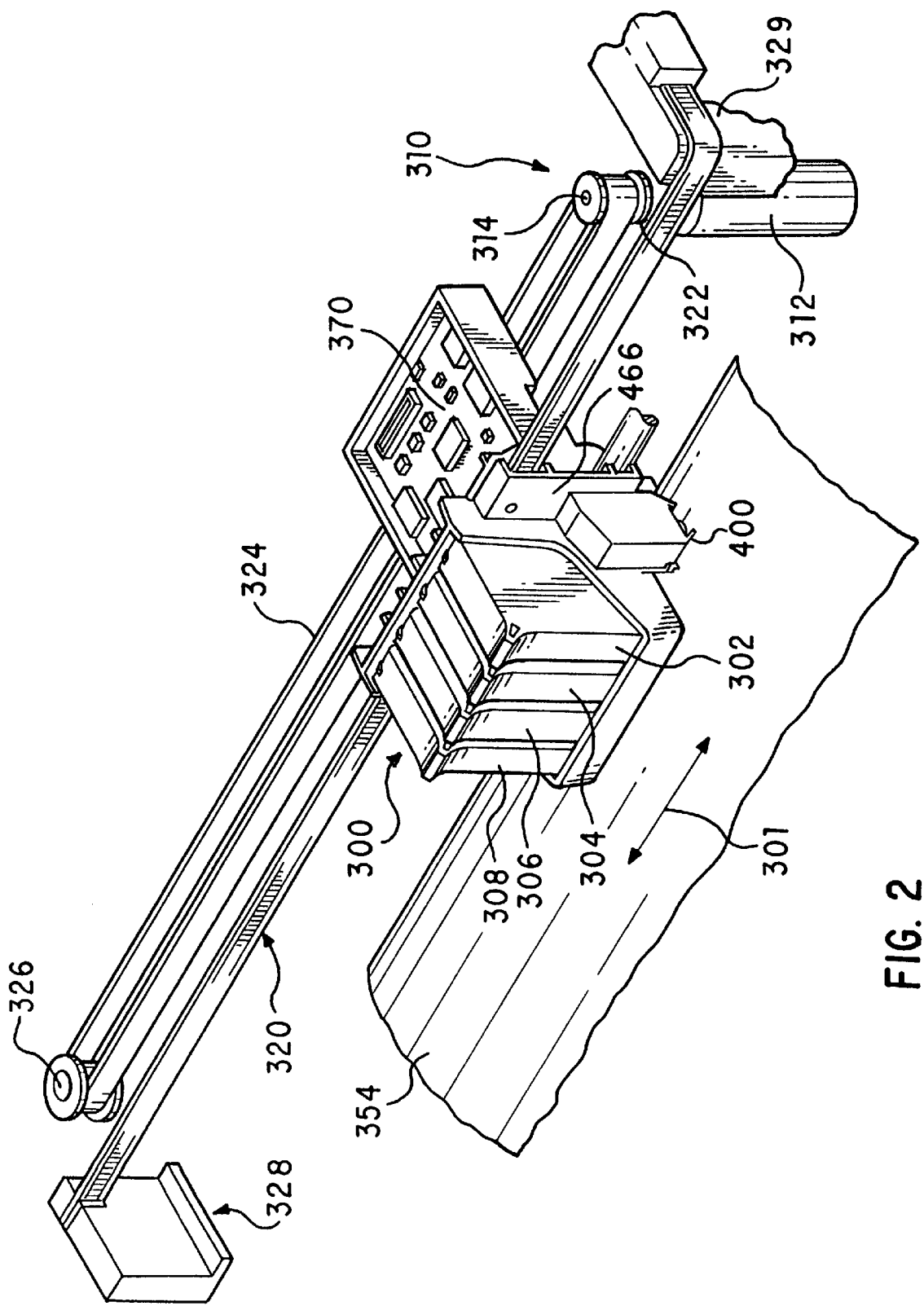
FIG. 2 is close-up view of the carriage portion of the printer/plotter of FIG. 1 showing a carriage-mounted optical sensor of the present invention.

FIG. 2 is a perspective view of the carriage assembly 300, the carriage positioning mechanism 310 and the encoder strip 320. The carriage positioning mechanism 310 includes a carriage position motor 312 which has a shaft 314 which drives a belt 324 which is secured by idler 326 and which is attached to the carriage 300.

The position of the carriage assembly in the scan axis is determined precisely by the encoder strip 320. The encoder strip 320 is secured by a first stanchion 328 on one end and a second stanchion 329 on the other end. An optical reader (not shown) is disposed on the carriage assembly and provides carriage position signals which are utilized by the invention to achieve optimal image registration in the manner described below.

Figure 3:
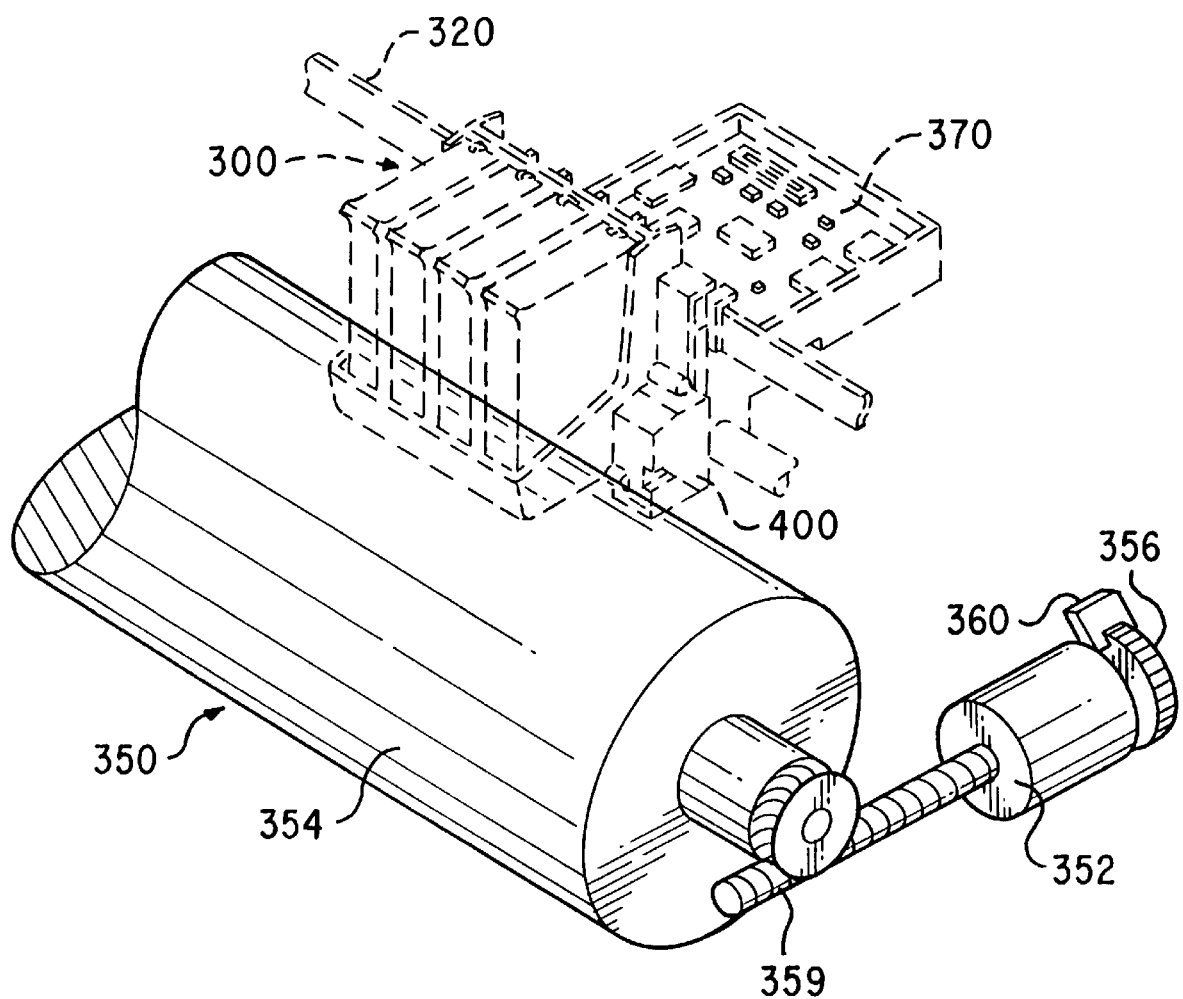
FIG. 3 is a close-up view of the platen portion of the printer/plotter of FIG. 1 showing the carriage portion in phantom lines.

FIG. 3 is perspective view of a simplified representation of a media positioning system 350 which can be utilized in the inventive printer. The media positioning system 350 includes a motor 352 having an axle gear 359, which is normal to and drives a media roller 354. The position of the media roller 354 is determined by a media position encoder 356 on the motor. An optical reader 360 senses the position of the encoder 356 and provides a plurality of output pulses which indirectly determines the position of the roller 354 and, therefore, the position of the media 230 in the X axis.

The media and carriage position information is provided to a processor on a circuit board 370 disposed on the carriage assembly 100 for use in connection with printhead alignment techniques of the present invention.

The printer 210 has four inkjet print cartridges 302, 304, 306, and 308 that store ink of different colors, e.g., black, magenta, cyan and yellow ink, respectively. As the carriage assembly 300 translates relative to the medium 230 along the X and Y axes, selected nozzles in the inkjet print cartridges 302, 304, 306, and 308 are activated and ink is applied to the medium 230. The colors from the three color cartridges are mixed to obtain any other particular color. Sample lines 240 are typically printed on the media 230 prior to doing an actual printout in order to allow the optical sensor 400 to pass over and scan across the lines as part of the initial calibration.

The carriage assembly 300 positions the inkjet print cartridges and holds the circuitry required for interface to the ink firing circuits in the print cartridges. The carriage assembly 300 includes a carriage 301 adapted for reciprocal motion on front and rear slider rods 303, 305.

As mentioned above, full color printing and plotting requires that the colors from the individual print cartridges be precisely applied to the media. This requires precise alignment of the carriage assembly as well as precise alignment of the print cartridges in the carriage. Unfortunately, paper slippage, paper skew, and mechanical misalignment of the print cartridges results in offsets in the X direction (in the media advance axis) and in the Y direction (in the carriage or axis) as well as angular theta offsets. This misalignment causes misregistration of the print images/graphics formed by the individual ink drops on the media. This is generally unacceptable as multi-color printing requires image registration accuracy from each of the printheads to within 1/1000 inch (1 mil).

Figure 4:
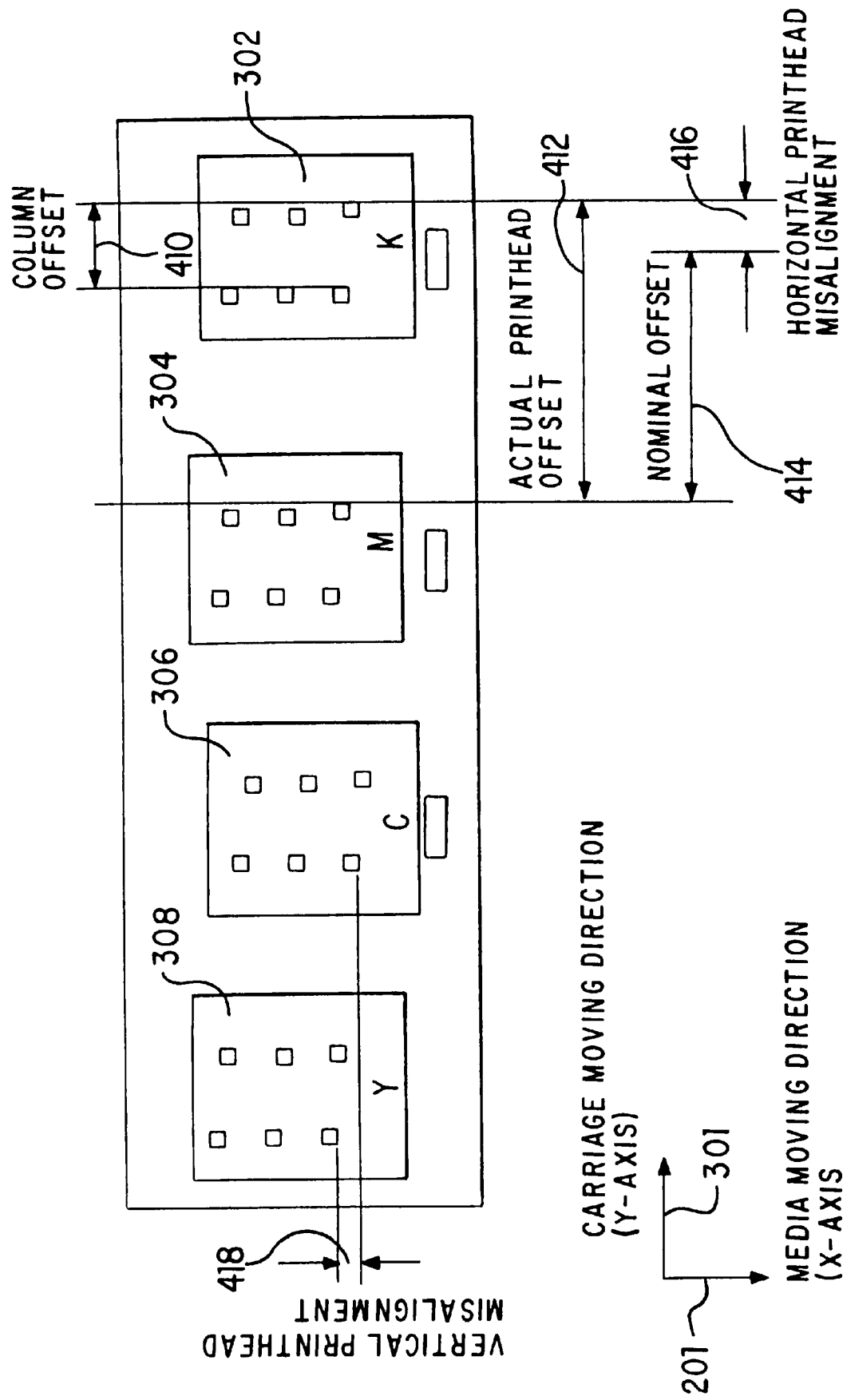
FIG. 4 is a schematic representation of a top view of the carriage showing offsets between individual printheads in the media advance axis and in the carriage scan axis.

FIG. 4 shows a presently preferred embodiment of printheads each having two groups of nozzles with a column offset 410. By comparing the relative positions of corresponding nozzles in different printheads along the Y axis, it is possible to determinine an actual horizontal offset 412 between two printheads, and by comparison with a nominal default offset 414 determine an actual horizontal misalignment offset 416 in the carriage scan axis. This is repeated for all of the different printheads while they remain on the carriage.

Similarly, by comparing the relative positions of corresponding nozzles in different printheads along the X axis, it is possible to determine an actual vertical misalignment offset 418 in the media advance axis. This is also repeated for all of the different printheads while they remain on the carriage.

Figure 5A:
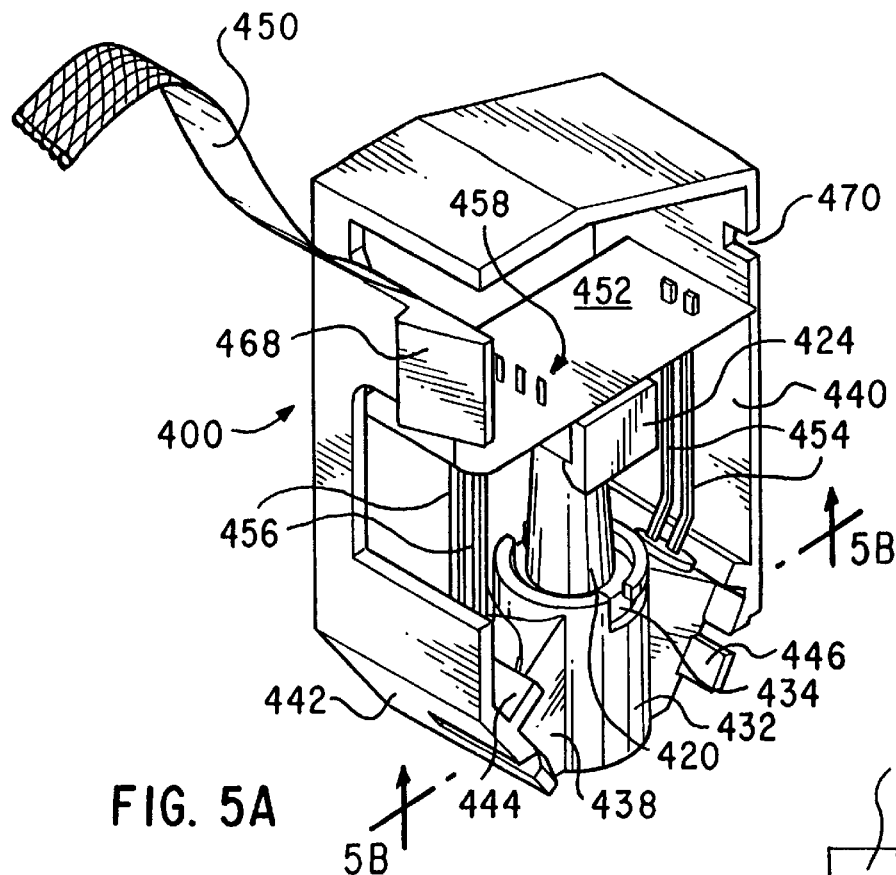
FIG. 5A is an isometric view showing a fully assembled optical sensor unit incorporating a presently preferred embodiment of the invention.
Figure 5B:
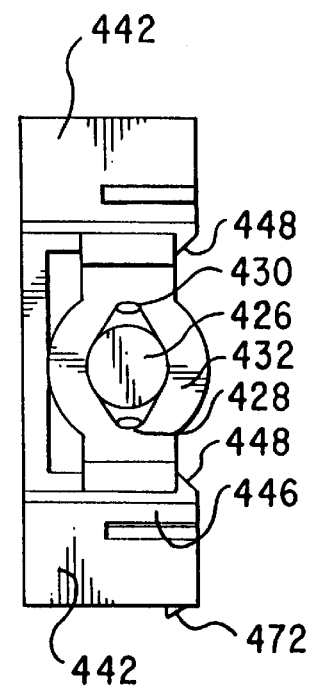
FIG. 5B is a bottom view of the optical sensor unit taken along the line 5B—5B in FIG. 5A.
Figure 6:
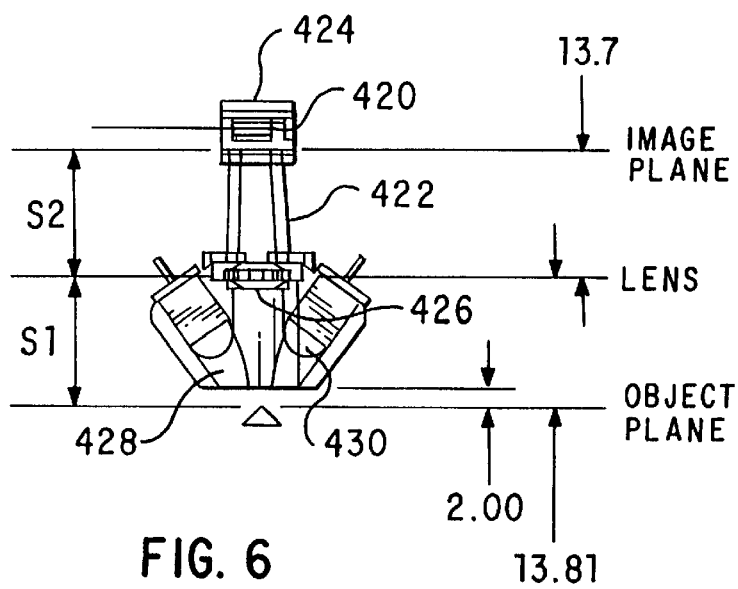
FIG. 6 is a front view of the optical components of the sensor unit of FIG. 5A.

In order to accurately scan across a test pattern line, the optical sensor 400 is designed for precise positioning of all of its optical components. Referring to FIGS. 5A, 5B, and 6, the sensor unit includes a photocell 420, holder 422, cover 424, lens 426, and light source such as two LEDs 428, 430. A unitary light tube or cap 432 has a pair of notched slots 434 which engage matching tabs 436 on a lower end of the holder 422 upon insertion and relative rotation between the cap and the holder. The two LEDs are held in opposite apertures of two shoulders 438 which have a size slightly less than the outside diameter of the LEDs, to prevent the LEDs from protruding into a central passageway which passes through the holder to the photocell.

A protective casing 440 which also acts as an ESD shield for the sensor components is provided for attachment to the carriage as well as for direct engagement with the shoulders of the light tube. In that regard, the top of the shoulders are sized and shaped to snugly fit inside downwardly tapered side walls 442 of the casing, with the top of the LEDs abutting against an upstanding flange 444 and with a lower portion of the shoulders held tightly by arms 446 which flex outwardly to an open position while the light tube is being pushed into a position of engagement with the casing. Upon completion of the engagement, the arms return to a closed latched position with a lip 448 on the end of each arm 446 preventing disengagement of the light tube (and its LEDs) during normal use.

FIGS. 7A–7E show a preferred sequence of steps for assembling the optical sensor. Firstly, a modular flex-circuit assembly is created with an elongated TAB circuit 450 having a junction portion 452 with soldered through-holes which (a) connect and support a first pair of wire leads 454 to one LED, (b) connect and support a second pair of wire leads 456 to another LED, and (c) connect and support a set of three wire leads 458 coming from the photocell (FIG. 7A). Secondly a U-shaped cover 424 holds the photocell in nested position at the upper end of the holder, while the LEDs and holder are positioned by the light tube (FIGS. 7B–7C). Finally, the subassembly is inserted into the casing, with a free end 462 of the TAB circuit extending out through an access slot in the casing (FIGS. 7D and 7E).

It will be appreciated by those skilled in the art from the foregoing description that the invention provides a self-fixturing modular assembly whereby the light tube acts as a cap for holding both the two LEDs as well as the lens/holder/photocell/cover composite in fixed relative positions. Accordingly, if desirable the soldering of the interconnections at the co-planar junction portion of the flex-circuit can be done after assembly of the various component parts held by the cap.

Figure 9:
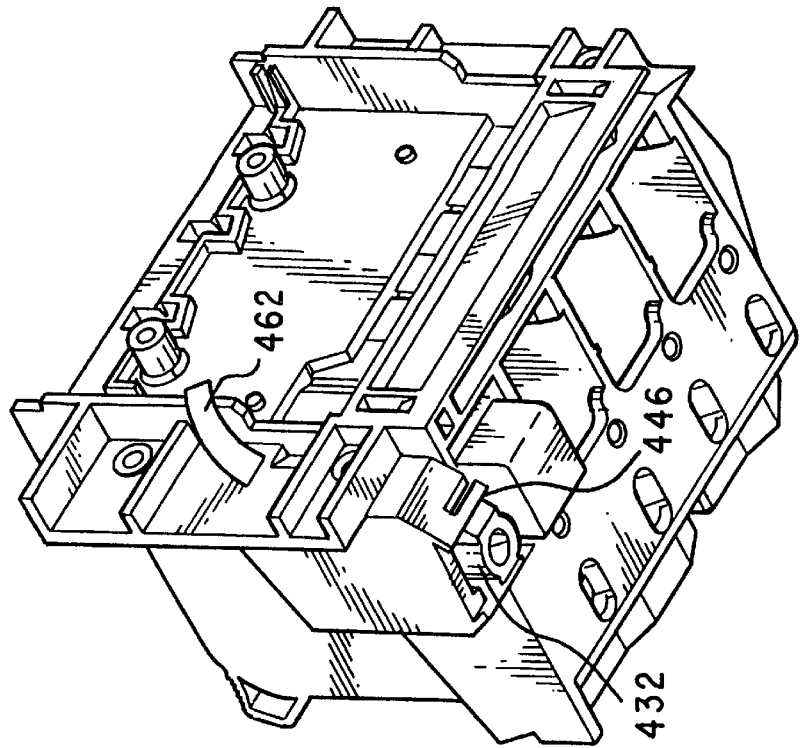
FIG. 9 is an isometric view looking up from the right rear side of the carriage showing the optical sensor and one print cartridge mounted on the carriage.
Figure 8:
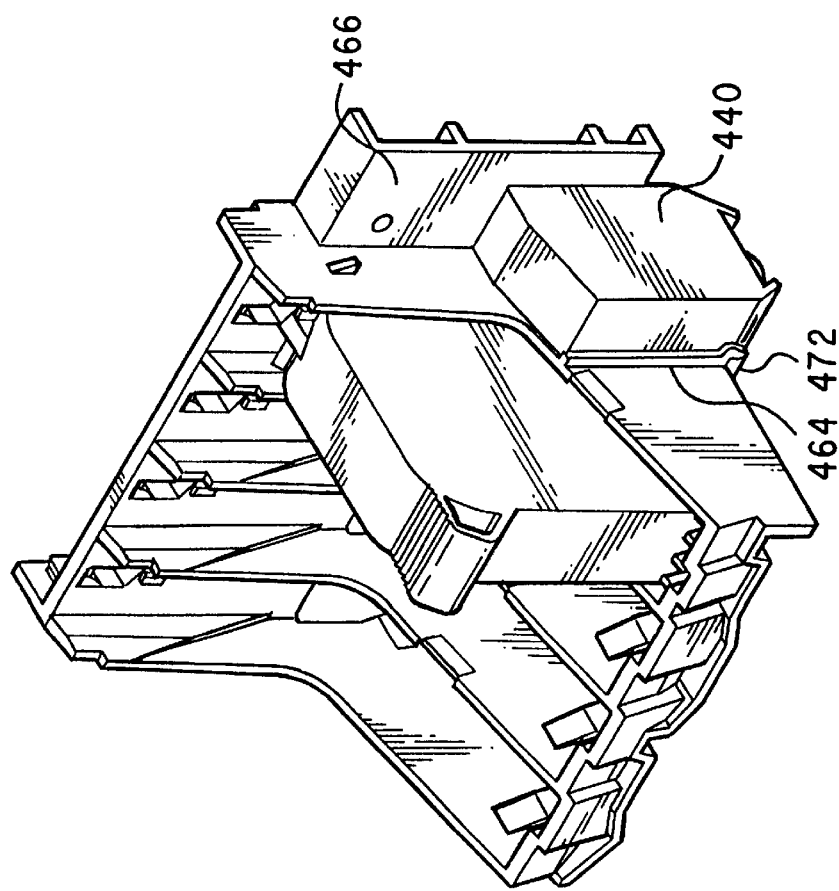
FIG. 8 is an isometric view looking down from the right front side of the carriage showing the optical sensor and one print cartridge mounted on the carriage.
Figure 10:
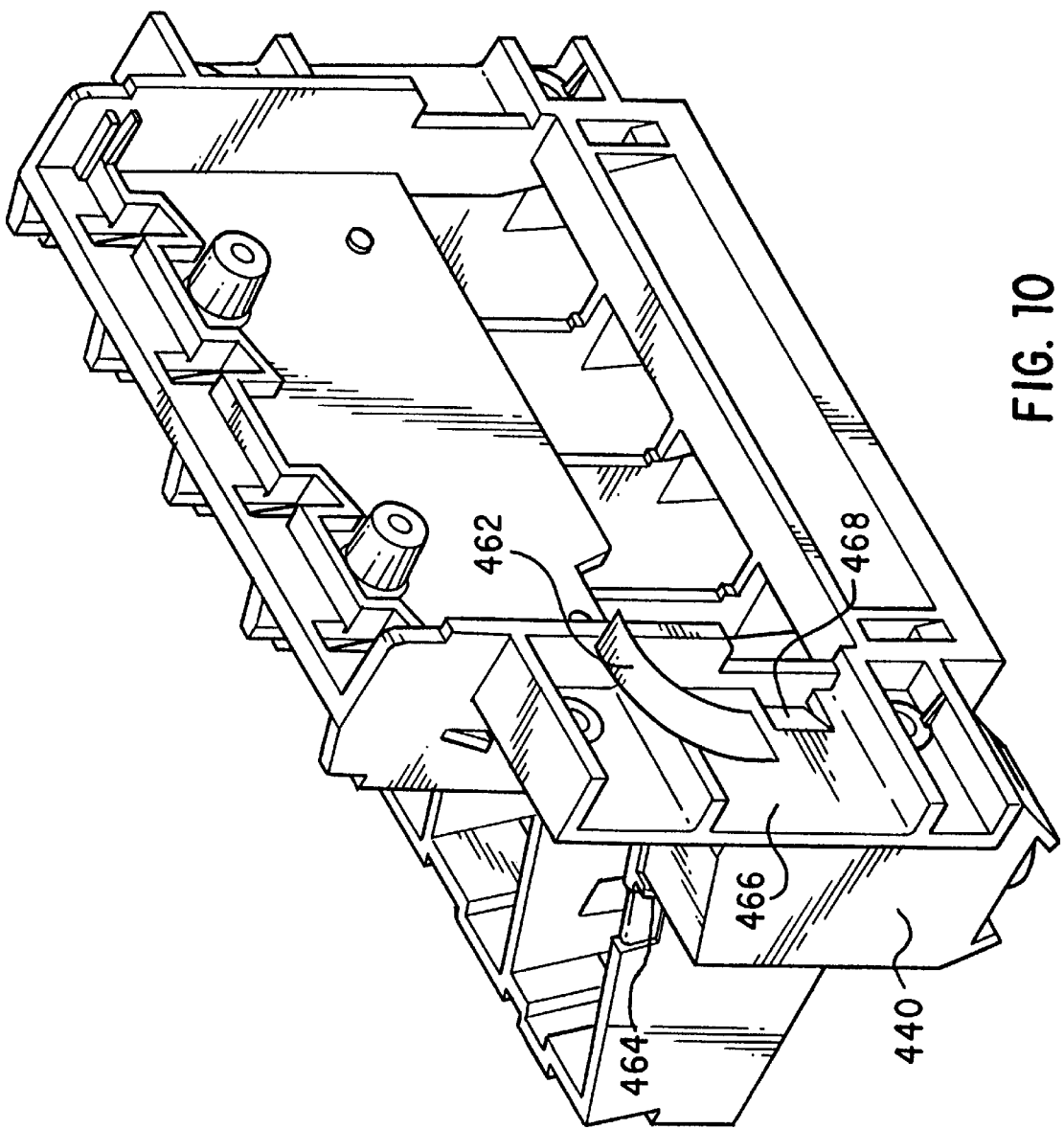
FIG. 10 is an isometric view looking down from the right rear side of the carriage showing the optical sensor mounted on the carriage.

The fully assembled optical sensor unit can then be placed inside of vertical rib 464 and against back plate 466 for self-attachment by rear tab 468, front notch 470, and lower front hook 472 to matching X/Y/Z datum-like surfaces on the carriage (see FIGS. 8–10).

The benefits and details of the co-planar junction feature of the flex-circuit are more fully described in the previously identified co-pending application entitled COMPACT FLEX-CIRCUIT FOR MODULAR ASSEMBLY OF OPTICAL SENSOR COMPONENTS IN AN INKJET PRINTER. The benefits and details of the optical features of the unitary light tube are more fully described in the previously identified co-pending application entitled OPTICAL PATH OPTIMIZATION FOR LIGHT TRANSMISSION AND REFLECTION IN A CARRIAGE-MOUNTED INKJET PRINTER SENSOR.

It should be understood that various changes and modifications can be made to the illustrated embodiments of the invention described herein, all without departing from the spirit and scope of the invention as set forth in the following claims.

I claim as my invention:

1. An inkjet printer/plotter having a carriage for carrying an optical sensor across print media, comprising:
   a photocell;
   a light tube having a first passageway facing toward the media and having an upper end for positioning said photocell to receive light passing through said light tube from said media;
   a light source positioned by said light tube to transmit emitted light through said first passageway, said light tube having an inner wall portion for directing said emitted light toward a predetermined portion of the media;
   a second passageway in said light tube facing toward said photocell and in optical communication with said predetermined portion of the media for allowing said emitted light to be reflected from said predetermined portion of the media to said photocell; and
   a casing for the optical sensor, said casing engageable with said light tube and attachable to said carriage for holding said light tube a predetermined distance above said media and providing a protective cover for the optical sensor components.

2. The inkjet printer/plotter of claim 1 which further includes a lens in said second passageway, said lens supported by said light tube.

3. The inkjet printer/plotter of claim 1 which further includes a holder for said photocell, said holder supported by said light tube.

4. The inkjet printer/plotter of claim 3, wherein said holder has a first end adjacent said photocell and a second end connected to said light tube.

5. The inkjet printer/plotter of claim 3 which further includes a lens in said second passageway, said lens positioned between said holder and said light tube.

6. The inkjet printer/plotter of claim 1 wherein said casing is engageable with said light tube through a lateral arm which restrains relative movement between said light tube and said casing.

7. The inkjet printer/plotter of claim 6 wherein said lateral arm is moveable from a first open position which allows said light tube to slidably engage said lateral arm to a second closed position which prevents relative movement between said light tube and said casing.

8. The inkjet printer/plotter of claim 7 wherein said lateral arm in said second closed position prevents relative movement between said light tube and said casing in the X axis.

9. The inkjet printer/plotter of claim 7 wherein said lateral arm in said second closed position prevents relative movement between said light tube and said casing in the Y axis.

10. The inkjet printer/plotter of claim 7 wherein said lateral arm in said second closed position prevents relative movement between said light tube and said casing in the Z axis.

11. The inkjet printer/plotter of claim 1 wherein said light tube is a unitary member.

12. An optical sensor device on a moveable carriage of an inkjet printer/plotter which carries printheads across media, comprising:
    a plurality of printheads on the carriage, each printhead containing a different color ink;
    a photodetection element;
    a holder for supporting said photodetection element, said holder having an elongated enclosed light passage in optical communication with said photo-detection element;
    a unitary light tube connected with said holder; and
    at least one light source which is in optical communication with said light tube for transmitting light to a portion of said media, said light tube also allowing reflected light from said portion of said media having a printhead X and Y axis calibration pattern to pass through both said lens and said light passage to said photodetection element.

13. The optical sensor device of claim 12 wherein said light source is a plurality of LEDs.

14. The optical sensor device of claim 12 which further includes a separate casing for attachment to the carriage, and wherein said light tube engages said casing and also supports said light source in a predetermined position relative to the media.

15. The optical sensor device of claim 12 which further includes a separate casing for attachment to the carriage, and wherein said light tube engages said casing and also supports said holder in order for said photodetection element to be in a predetermined position relative to the media.

16. The optical sensor device of claim 12 which further includes a separate casing for attachment to the carriage, and wherein said light tube engages said casing and also supports said lens in a predetermined position relative to the media.

17. An optical sensor system on a carriage of an inkjet printer/ plotter, comprising:
    a plurality of printheads on the carriage, each printhead containing a different color ink;
    at least one light source on the carriage;
    a photocell device on the carriage;
    a lens on the carriage;
    a unitary light tube for positioning said photocell device, said lens and said light source in prdetermined positions relative to each other as well as relative to print media passing through said printer/plotter in order for light to be transmitted from said at least one light source through said light tube to the print media and then reflected from a printhead X and Y axis calibration pattern on the print media through said lens to said photocell device; and
    a separate casing engageable with said unitary light tube for attachment to the carriage and protection of the optical sensor components.

* * * * *